US008143568B2

(12) United States Patent
Flaherty

(10) Patent No.: US 8,143,568 B2
(45) Date of Patent: Mar. 27, 2012

(54) PHOTOCONTROL DEVICES AND METHODS FOR FORMING THE SAME

(75) Inventor: Richard Charles Flaherty, Fuquay-Varina, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 490 days.

(21) Appl. No.: 12/417,387

(22) Filed: Apr. 2, 2009

(65) Prior Publication Data

US 2010/0252715 A1 Oct. 7, 2010

(51) Int. Cl.
*H01R 33/945* (2006.01)
(52) U.S. Cl. ........................................ 250/239; 439/517
(58) Field of Classification Search .................. 250/239; 439/517
See application file for complete search history.

(56) References Cited

U.S. PATENT DOCUMENTS

| | | | |
|---|---|---|---|
| 4,653,834 A | 3/1987 | Norden | |
| 6,663,405 B1 | 12/2003 | Robinson et al. | |
| 6,997,739 B2 | 2/2006 | Hoxha | |
| 7,016,802 B2 | 3/2006 | Flaherty | |
| 2005/0266716 A1 | 12/2005 | Hoxha | |
| 2005/0282430 A1 | 12/2005 | Hoxha | |

FOREIGN PATENT DOCUMENTS

DE 42 21 137 A1 1/1994

OTHER PUBLICATIONS

"Ready Reference Guide, Photo controls and Light Products," http://energy.tycoelectronics.com/rrg/air_rrg/mainindx.pdf, Copyright 2001, Tyco Electronics.
Notification of Transmittal of the International Search Report and the Written Opinion of the International Searching Authority, or the Declaration, in corresponding PCT Application No. PCT/US2010/026143, mailed Jun. 8, 2010, 12 pages.

*Primary Examiner* — Seung C Sohn
(74) *Attorney, Agent, or Firm* — Myers Bigel Sibley & Sajovec, PA

(57) ABSTRACT

A photocontrol device for controlling a powered device includes a housing assembly defining a cavity and including a base assembly. The base assembly includes an outer base member having a base opening, and an inner base member separately formed from the outer base member and mounted in the base opening. A circuit board is disposed in the cavity. A photosensor is connected to the circuit board. An elongate contact member is mechanically and electrically coupled to the circuit board. The elongate contact member is mounted on and extends through the inner base member. The elongate contact member is adapted to electrically connect the photocontrol device with the powered device.

24 Claims, 8 Drawing Sheets

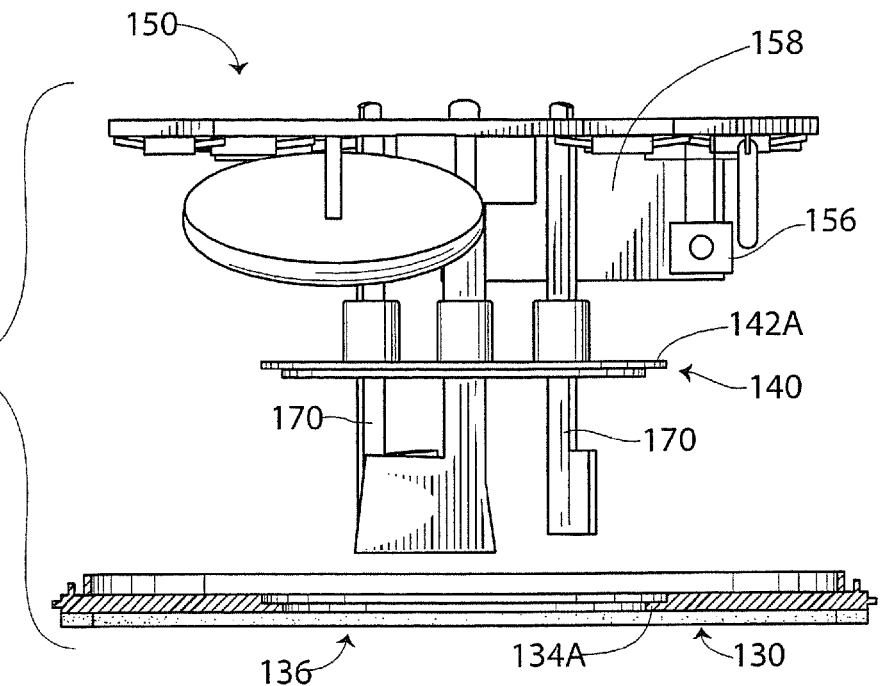
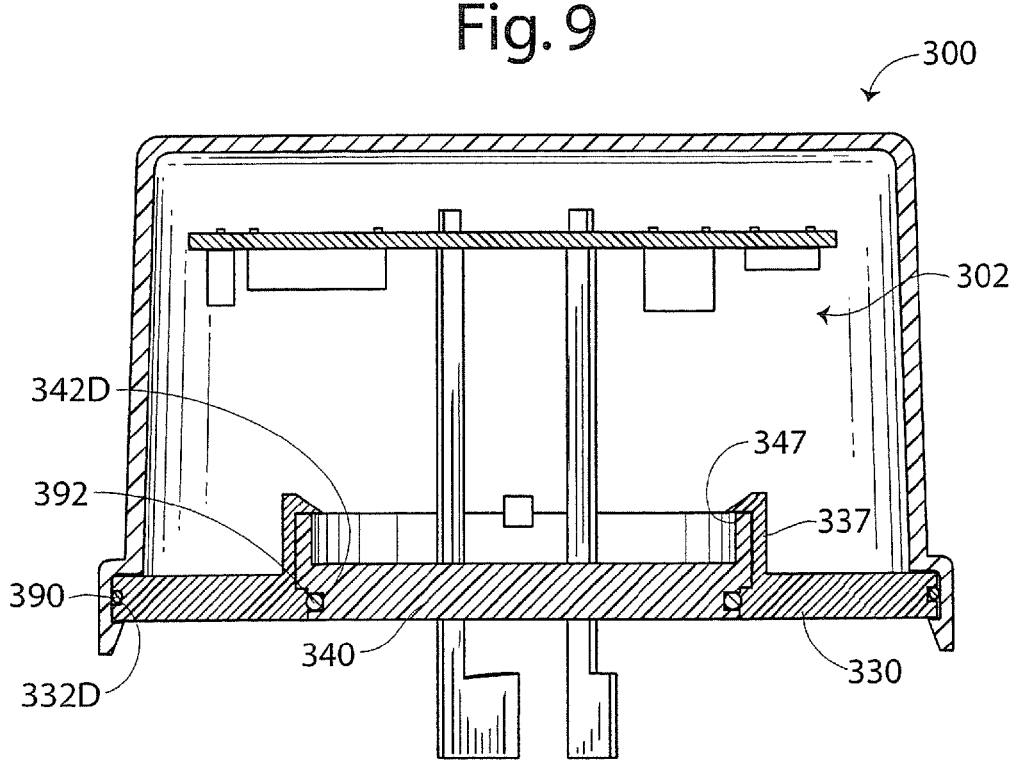

PHOTOCONTROL DEVICES AND METHODS FOR FORMING THE SAME

FIELD OF THE INVENTION

The present invention relates to control devices and, more particularly, to photocontrol devices and methods of forming the same.

BACKGROUND OF THE INVENTION

Photocontrol devices are used in a variety of applications where it is desirable to provide a control signal responsive to detection of a light level. One common application of such photocontrol devices is in the detection of ambient light levels. In particular, photocontrol devices may be used to detect the transition from daylight to night so that lights may be turned on for security, safety and/or aesthetic reasons. For example, street lights are generally provided with photocontrol devices to turn on the street lights at dusk. Examples of such photocontrol devices include the Model ALR 1000, 2000, and 6000 series of photocontrols available from Tyco Electronics Corporation. Such a device may include a switch mode power converter of relatively high voltage alternating current to relatively low voltage direct current. Light may be detected by a photocontrol transistor and the electric impulses therefrom may be analyzed by various circuit components having a programmable reference level. The transistor may further operate as a switch (ON/OFF), based on a preset value corresponding to the intensity of detected light passing from day to night and vice-versa.

SUMMARY OF THE INVENTION

According to embodiments of the present invention, a photocontrol device for controlling a powered device includes a housing assembly defining a cavity and including a base assembly. The base assembly includes an outer base member having a base opening, and an inner base member separately formed from the outer base member and mounted in the base opening. A circuit board is disposed in the cavity. A photosensor is connected to the circuit board. An elongate contact member is mechanically and electrically coupled to the circuit board. The elongate contact member is mounted on and extends through the inner base member. The elongate contact member is adapted to electrically connect the photocontrol device with the powered device.

In some embodiments, the inner base member is welded to the outer base member.

According to some embodiments, the inner base member is mechanically secured to the outer base member by interlock features.

An O-ring may be interposed between the inner base member and the outer base member to provide an environmental seal.

In some embodiments, the housing assembly includes a cover member mounted on the outer base member and defining the cavity. The cover member may include a translucent portion to expose the photosensor to ambient light.

In some embodiments, a conductor layer is disposed on a side of the circuit board opposite the inner base member. According to some embodiments, the conductor layer is a wave soldered layer. A plurality of electronic components may be mounted on a side of the circuit board proximate the inner base member. The electronic components have contacts that extend through the circuit board and are electrically connected by the conductor layer.

In some embodiments, the powered device is a lighting device.

According to embodiments of the present invention, a lighting system includes a lighting device and a photocontrol device. The lighting device includes a lamp and a photocontroller connector. The photocontrol device is operatively connected to the photocontroller connector and includes a housing assembly defining a cavity and including a base assembly. The base assembly includes an outer base member having a base opening, and an inner base member separately formed from the outer base member and mounted in the base opening. A circuit board is disposed in the cavity. A photosensor is connected to the circuit board. An elongate contact member is mechanically and electrically coupled to the circuit board. The elongate contact member is mounted on and extends through the inner base member. The elongate contact member engages the photocontroller connector to electrically connect the photocontrol device with the lighting device. The photocontrol device is operative to control the lighting fixture responsive to light incident on the photo sensor.

According to method embodiments of the present invention, a method for manufacturing a photocontrol device for controlling a powered device includes: mounting an elongate contact member in an inner base member, wherein the elongate contact member is adapted to electrically connect the photocontrol device with the powered device; mounting the elongate contact member on a circuit board electrically connected to a photosensor; and mounting the inner base member with the elongate contact member in an opening of an outer base member to form a base assembly.

According to some embodiments, the method includes applying a conductor layer to the circuit board with the elongate contact member mounted in the inner base member and the circuit board to electrically connect the elongate contact member to the circuit board. The method may include applying the conductor layer to a side of the circuit board opposite the inner base member. In some embodiments, the method includes mounting a plurality of electronic components a side of the circuit board proximate the inner base member such that contacts of the electronic components extend through the circuit board; and thereafter applying the conductor layer to the side of the circuit board opposite the inner base member to electrically connect the contacts to the circuit board by the conductor layer. Applying the conductor layer to the circuit board may include wave soldering the conductor layer onto the circuit board with the elongate contact member mounted in the inner base member and the circuit board to electrically connect the elongate contact member to the circuit board. In some embodiments, the method includes: forming a unitary circuit board assembly including a plurality of circuit boards; providing a plurality of inner base members, a plurality of outer base members, and a plurality of elongate contact members; mounting each of the elongate contact members in a respective one of the inner base members; mounting each of the elongate contact members on a respective one of the circuit boards; thereafter wave soldering an assembly conductor layer onto the unitary circuit board assembly; separating the circuit boards from one another to form subunits each including a respective elongate contact member, a respective inner base member, a respective circuit board, and a respective conductor layer from the assembly conductor layer electrically connecting the respective elongate contact member to the respective circuit board; and mounting each subunit in a respective outer base member such that the inner base member of the subunit is received in an opening of the respective outer base member to form a base assembly. The method may include mounting a respective cover member on each of the base assemblies.

According to some embodiments, the method includes welding each inner base member to the outer base member in which it is received.

According to some embodiments, the method includes mechanically securing each inner base member to the outer base member in which it is received using interlock features.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 7 is an exploded, cross-sectional view of the photocontrol device of FIG. 1 taken along the line 7-7 of FIG. 1.

FIG. 9 is a cross-sectional view of a photocontrol device according to further embodiments of the present invention.

DETAILED DESCRIPTION OF EMBODIMENTS OF THE INVENTION

Figure 1:
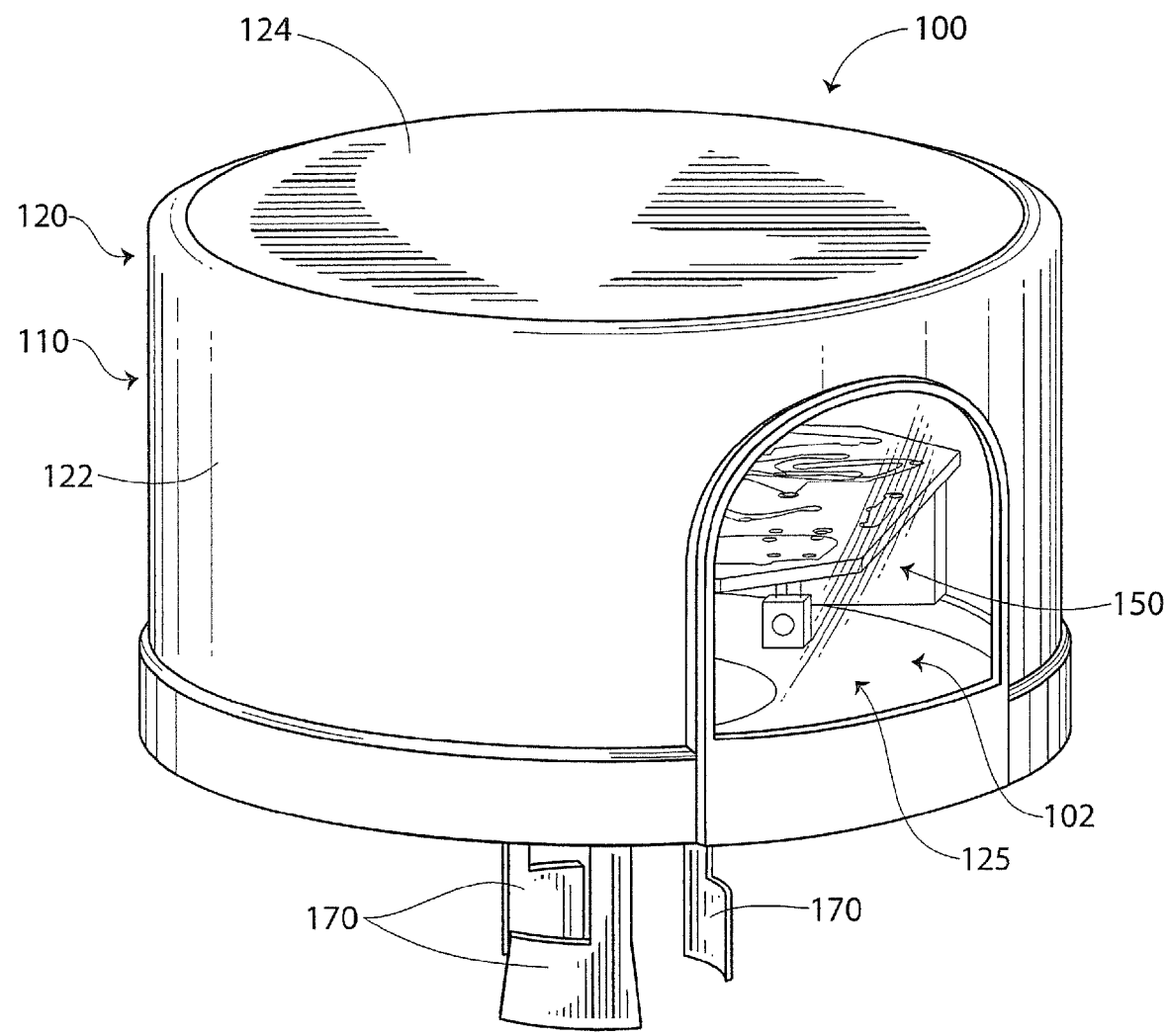
FIG. 1 is a top perspective view of a photocontrol device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art. Well-known functions or constructions may not be described in detail for brevity and/or clarity.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
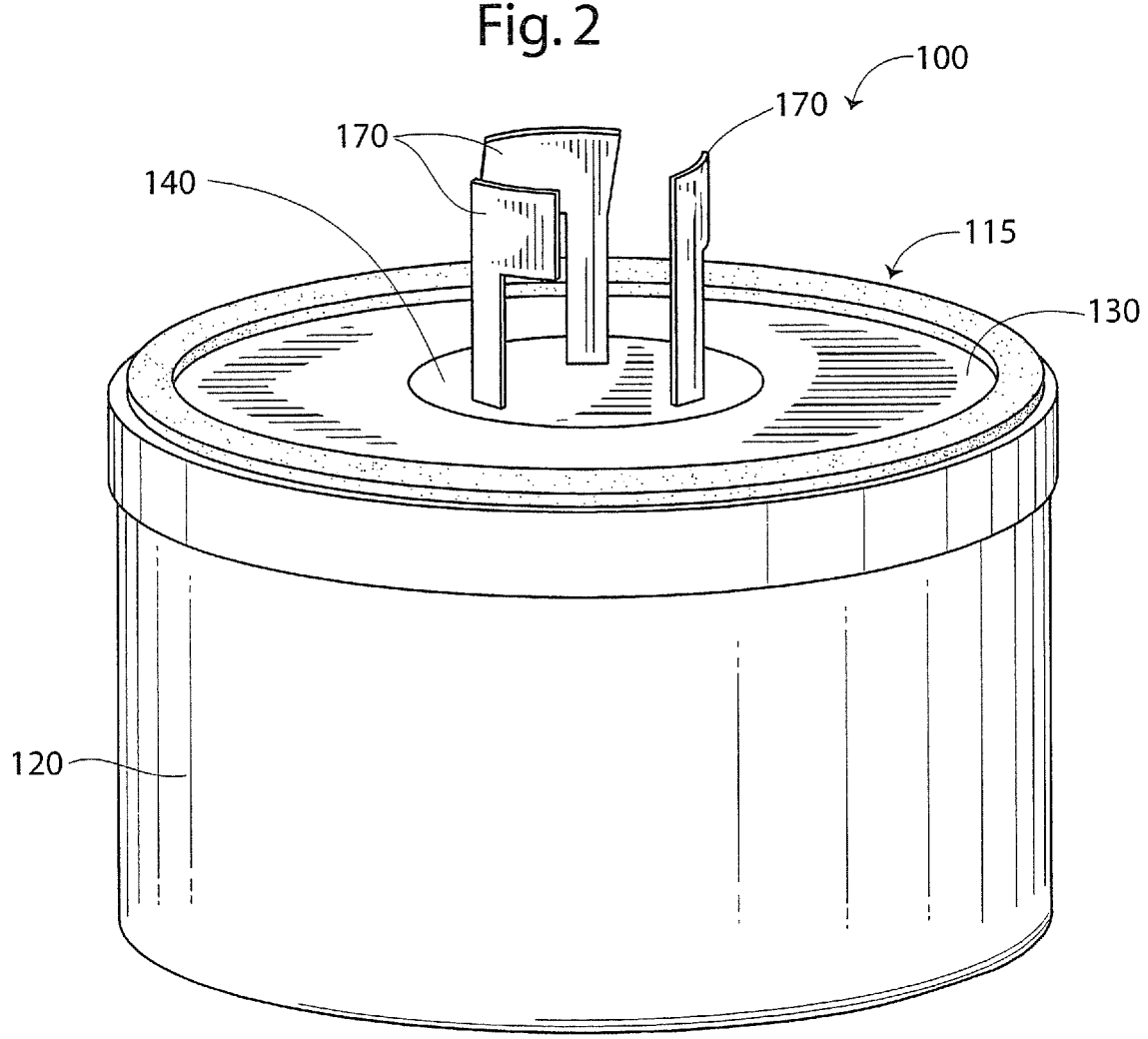
FIG. 2 is a bottom perspective view of the photocontrol device of FIG. 1.
Figure 3:
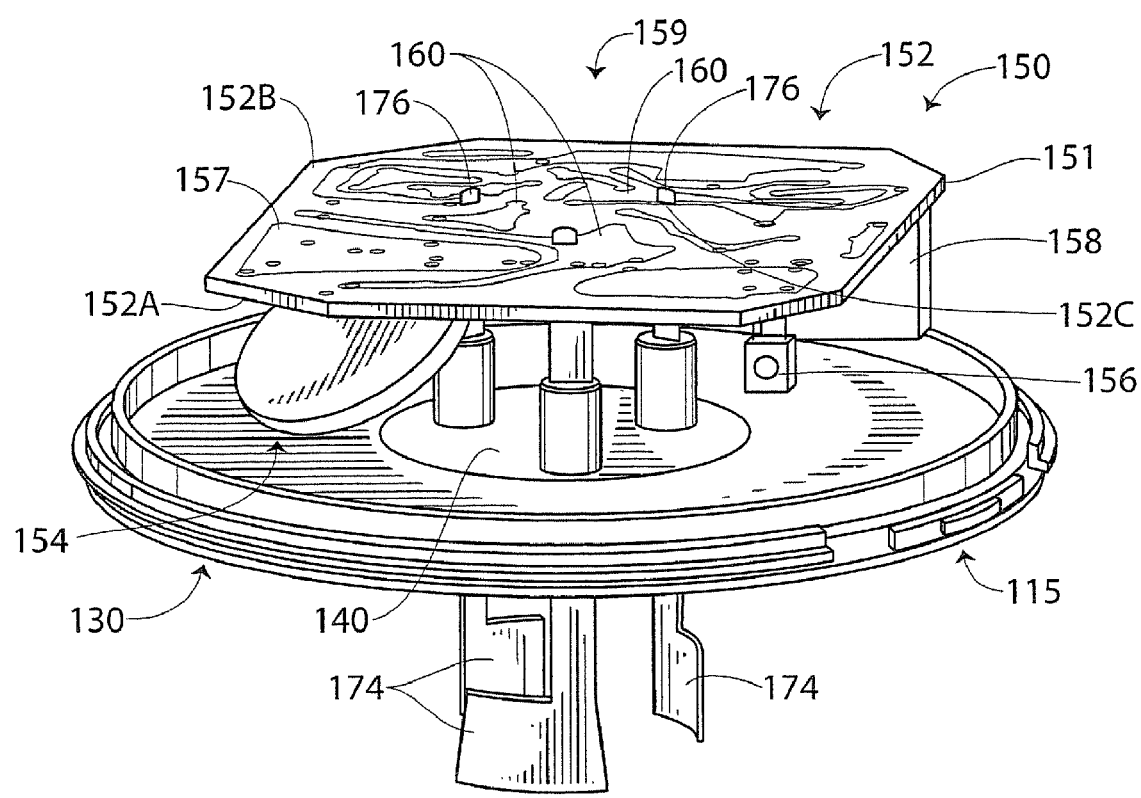
FIG. 3 is a top perspective view of the photocontrol device of FIG. 1 wherein a cover member thereof has been removed.
Figure 8:
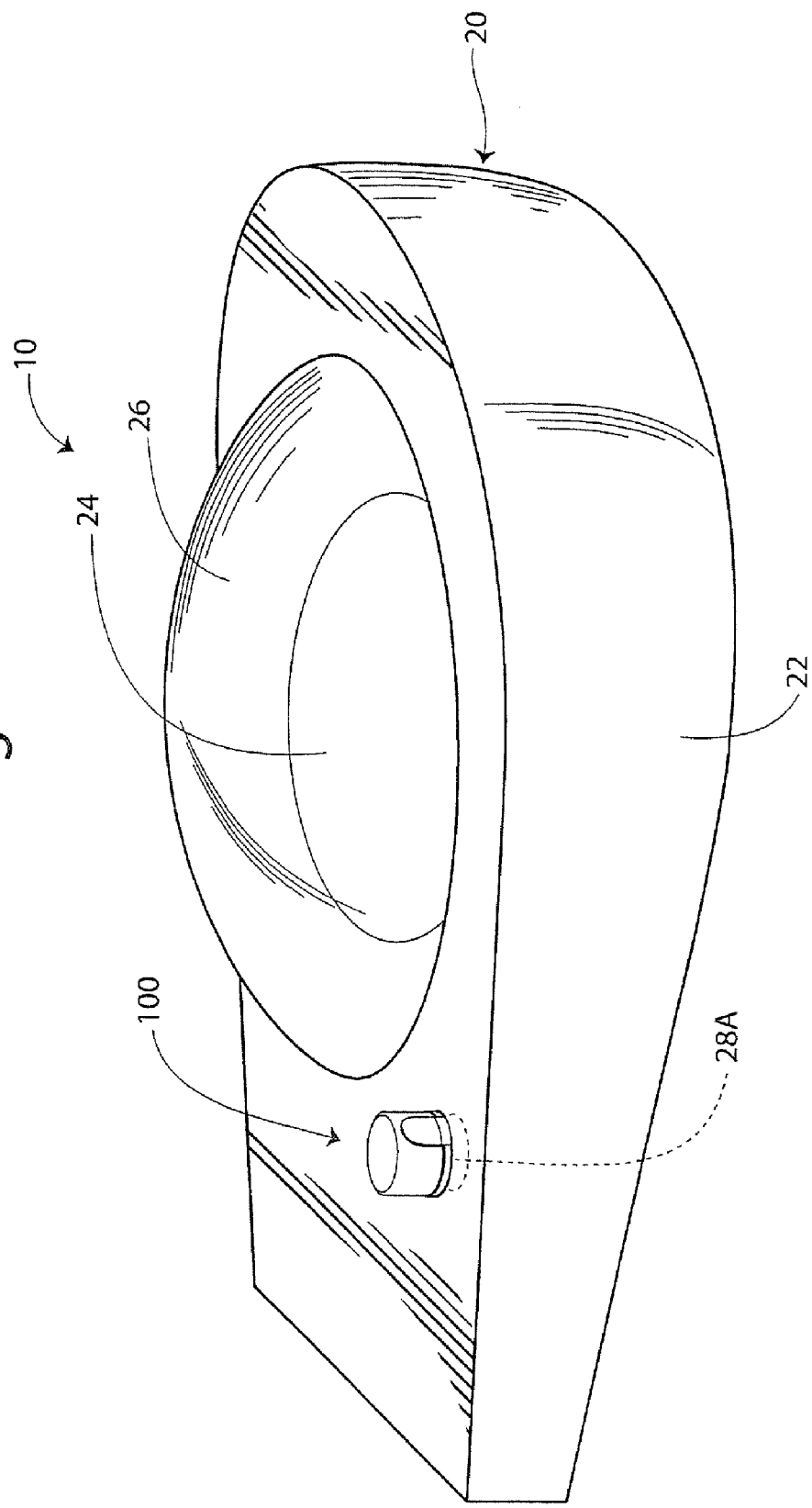
FIG. 8 is a perspective view of a lighting system including the photocontrol device of FIG. 1.

Embodiments of the present invention will now be described with reference to FIGS. 1-8. FIGS. 1 and 2 are top and bottom perspective views of a photocontrol device 100 according to embodiments of the present invention. According to some embodiments, the photocontrol device 100 is operably installed in a lighting device, such as a light fixture 20 to form a lighting system 10 as shown in FIG. 8. The photocontrol device 100 may be a modular unit.

The photocontrol device 100 includes a housing assembly 110, a circuit board assembly 150 and elongate contact members 170. The housing assembly 110 includes a cover member 120 and a base assembly 115 that collectively define an enclosure cavity 102 (FIG. 1) wherein the circuit board assembly 150 is enclosed. The contact members 170 extend through the base assembly 115 so that a portion of each contact member 170 extends into the enclosure cavity 102 and a portion of each contact member 170 extends outwardly from the bottom of the housing assembly 110.

The cover 120 as illustrated includes a cylindrical side wall 122 and an end wall 124 defining a cavity 125 and an opening opposite the end wall 124 and communicating with the cavity 125. At least a portion of the end wall 124 or the sidewall 122 is light transmissive. The cover 120 may be formed of a polymeric material, such as ultraviolet (UV) resistant polypropylene. According to some embodiments, the cover 120 is unitarily molded.

Each contact member 170 (FIG. 4) includes a body 172 having a connector feature 174 on one end and a blade or contact end 176 on the opposing end. The connector features 174 may be twist-lock structures to provide a locking-type photocontrol unit, for example. The contact ends 176 mechanically and electrically engage and couple with the circuit board assembly 150, as discussed in more detail below.

The contact members 170 may be formed of a suitable electrically conductive material such as brass.

The base assembly 115 includes an outer skirt or base member 130 and a separately formed center piece or inner base member 140. The base members 130, 140 may be formed of any suitable material. According to some embodiments, the base members 130, 140 are formed of a polymeric material such as polybutylene terephthalate. According to some embodiments, the base members 130, 140 are molded.

Figure 4:
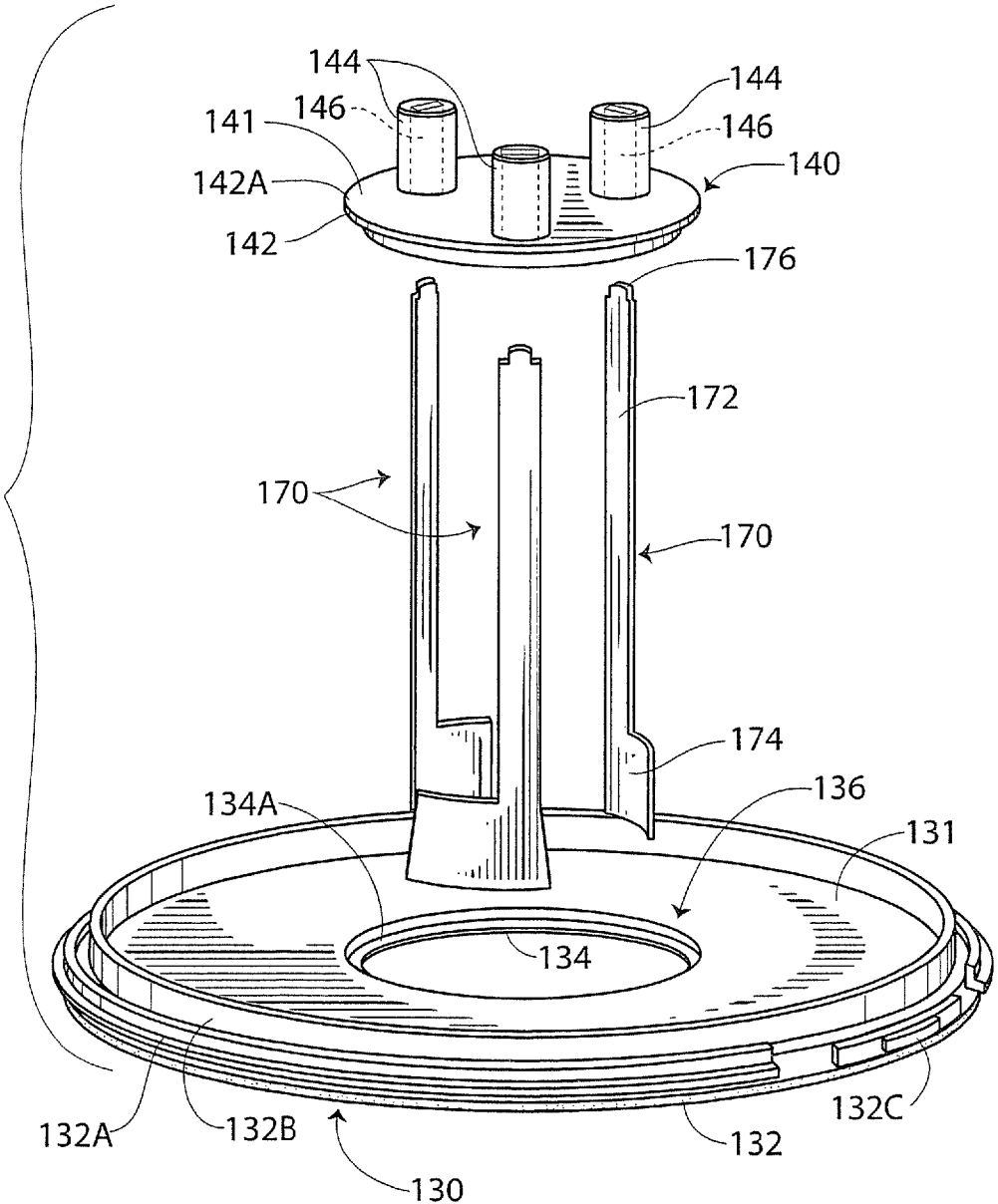
FIG. 4 is an exploded, top perspective view of a base assembly and contact members forming parts of the photocontrol device of FIG. 1.

With reference to FIG. 4, the outer base member 130 includes a body 131 having an annular outer edge 132 and an annular inner edge 134. The inner edge 134 defines an interior opening 136. An annular lateral flange 132A and an annular upstanding flange 132B extend along the outer edge 132. An annular flange 134A extends along the inner edge 134. A locator or interlock feature 132C is also located on the outer edge 132 to interlock with the cover member 120.

The inner base member 140 includes a body 141 having an outer edge 142. An annular flange 142A extends along the outer edge 142. Three risers 144 project upwardly from the body 141. A contact member passage 146 extends axially through each riser 144.

The inner base member 140 is secured in the outer base member 130 to form the integrated base assembly 115. The body 141 is received in the opening 136 and the flange 142A rests on the flange 134A. According to some embodiments, the inner base member 140 is bonded to the outer base member 130 along the interface therebetween (e.g., by adhesive). According to some embodiments, the inner base member 140 is welded to the outer base member 130.

The circuit board assembly 150 includes a printed circuit board (PCB) 152 and a photocontrol electrical circuit 159 mounted, at least in part, on the PCB 152. The PCB 152 includes a substrate 151 having opposed bottom and top sides 152A and 152B. The electrical circuit 159 may embody a detection and switching circuit. The electrical circuit 159 may include various electrical components 154 including a photosensor 156 and a switching device 158 mounted on the bottom side 152A of the PCB 152 (i.e., the side proximate or facing the base assembly 115). The switching device 158 is illustrated as a relay. The electrical circuit 159 further includes conductive (e.g., copper) traces 157 and a conductor layer 160, which may be a solder layer, on the top side 152B of the PCB 152 (i.e., the side opposite or facing away from the base assembly 115). The electrical circuit 159 may comprise further components such as insulated wires, resistors, capacitors and the like. Holes 152C extend through the PCB 152 to permit passage of the contact ends 176 through the PCB 152 from the bottom side 152A to the top side 152B. Throughholes may also be provided in the PCB 152 through which contacts of the various electrical components extend.

According to some embodiments and as illustrated, the outer perimeter profile or diameter of the inner base member 140 fits laterally within the outer perimeter profile or diameter of the PCB 152 and the outer perimeter profile or diameter of the outer base member 130 extends laterally outwardly beyond the outer perimeter profile or diameter of the PCB 152.

The electrical circuit 159 may be configured so that the detection of light by the photosensor 156 activates or deactivates the relay 158. The relay 158 may, in turn, be coupled through the contact members 170 to an associated light source, such as the light fixture 20 (FIG. 8) that may be turned on or off responsive to the state of the relay 156. It will be understood by those of skill in the art that various conventional detection elements may be used to couple the photosensor 156 to the switching device 158. For example, a comparator may be provided as a detection element in a detection circuit. The comparator may be an analog comparator having a reference voltage and/or may be a digital circuit having a programmable reference level.

With reference to FIG. 8, the photocontrol device 100 can be used with the light fixture 20 as follows. The light fixture 20 includes a housing 22, a lamp 24, a cover 26 enclosing the lamp 24, and a photocontrol device receptacle 28. The light fixture 20 includes suitable circuitry and a power source, such as an alternating current (AC) power source, to illuminate the lamp 24. The photocontrol device 100 is mounted in the receptacle 28, such that the connector features 174 of the contact members 170 operatively engage mating electrical connectors 28A of the light fixture 20. The photocontrol device 100 may serve to close and interrupt the supply of power to the lamp 24.

In use, the light transmissive end wall 124 of the cover 120 allows ambient light to reach the photosensor 156 where it is detected by the detection circuit 159. The photocontrol device 100 may thereby control the operation of the light fixture 20 according to the calibration of the photocontrol device 100. For example, the electric impulses from the photosensor 156 may be analyzed by various circuit components having a programmable reference level. The relay 158 may further operate as a switch (ON/OFF), based on a preset value corresponding to the intensity of detected light passing from day to night and vice-versa, for example. Thus, according to some embodiments, when light having at least a predetermined intensity is incident on the photosensor 156, the photocontrol device 100 will switch the light fixture 20 off so that the lamp 24 is not illuminated. When the light incident on the photosensor 156 is below a specified intensity, the photocontrol device 100 will switch the light fixture 20 on so that the lamp 24 is illuminated. Hysteresis may be provided in suitable levels. The photocontrol device 100 may also be a switch mode power converter of relatively high voltage alternating current to relatively low voltage direct current. According to some embodiments, the photocontrol device 100 can be removed and replaced in the receptacle 28.

The construction of the photocontrol device 100 may be further appreciated from the following description of methods for forming the photocontrol device 100 in accordance with some embodiments of the invention.

Figure 5:
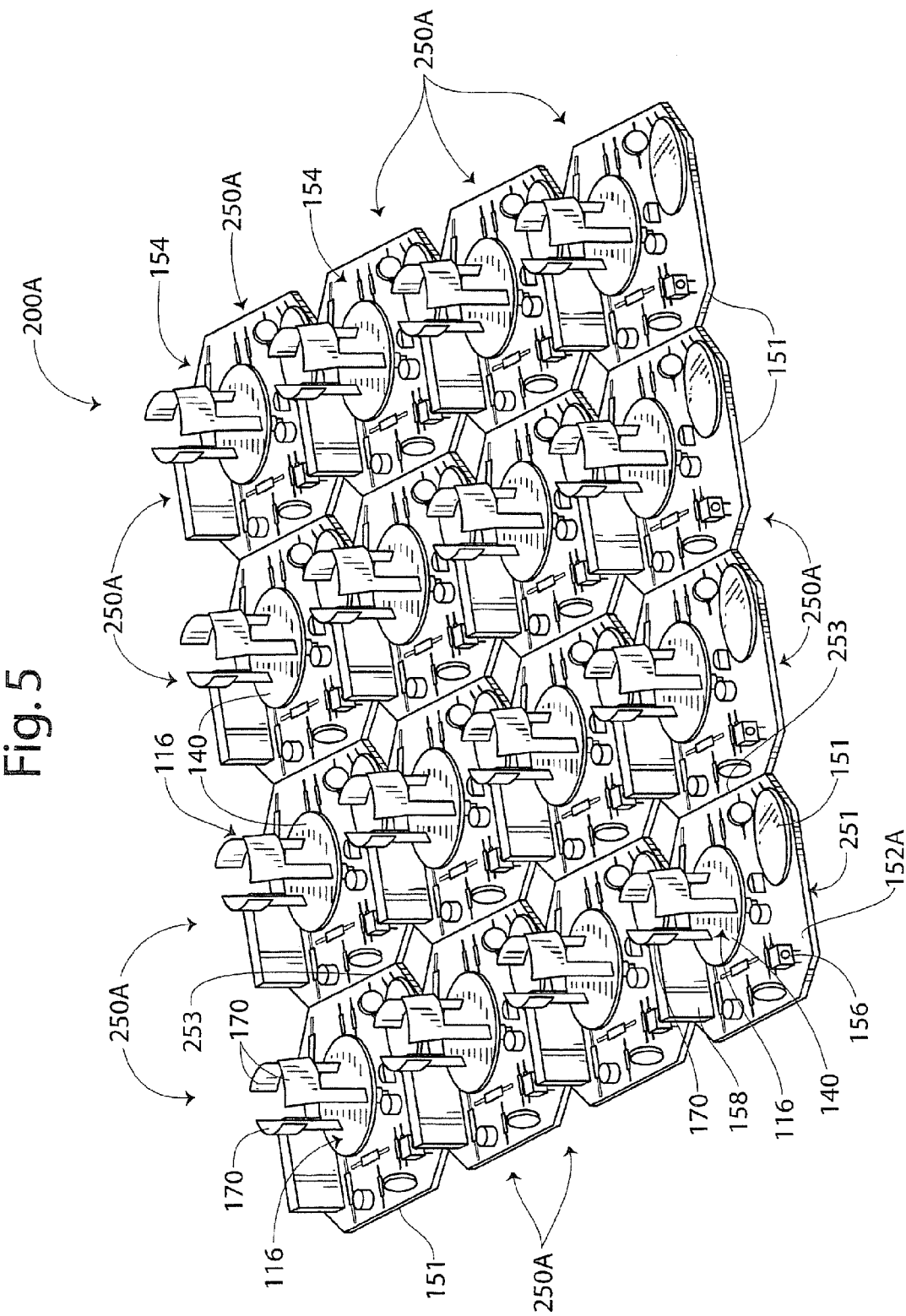
FIG. 5 is a bottom perspective view of an intermediate multi-unit assembly used in methods according to embodiments of the present invention for forming a plurality of the photocontrol devices of FIG. 1.
Figure 6:
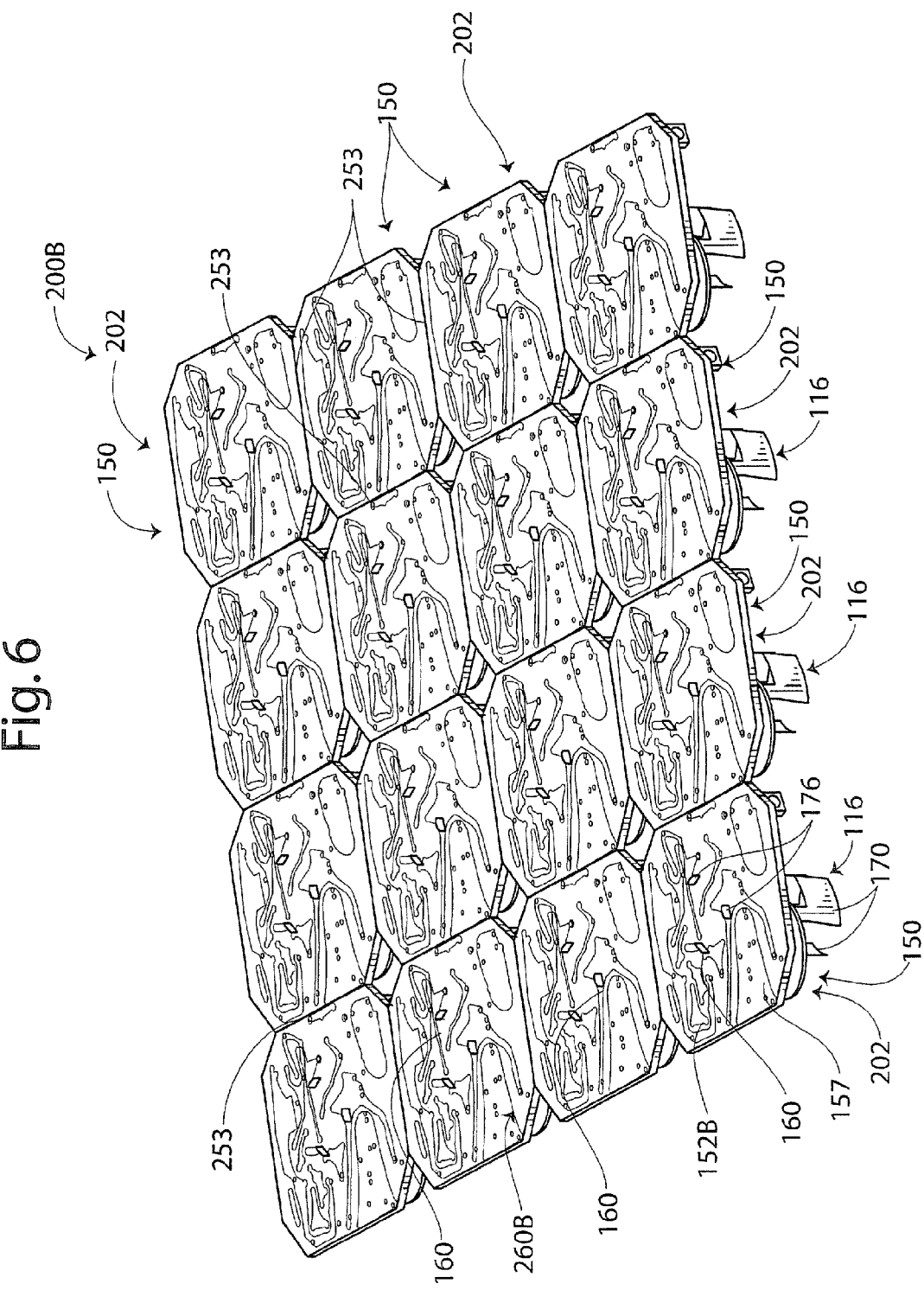
FIG. 6 is a top perspective view of the multi-unit assembly of FIG. 5 with a solder layer applied thereto to form a plurality of the photocontrol devices of FIG. 1.

With reference to FIG. 5, an intermediate multi-unit printed circuit board (PCB) assembly 200A is constructed and assembled. The multi-unit PCB assembly 200A includes an integral, unitary PCB substrate or panel 251. The PCB substrate 251 includes a plurality of the individual PCB substrates 151 (as shown, a four by four array) separated by and joined along frangible break lines 253. Each individual PCB substrate 151 has its copper traces 157 on the top side 152B thereof. Each individual PCB substrate 151 also has the aforementioned electrical components 154 (including a photosensor 156 and a relay 158) mounted on the bottom side thereof with their electrical contacts extending through throughholes in the PCB substrate 251. The PCB substrate 251, the copper traces 157 and the electrical components 154 thereby collectively form an integral array of intermediate circuit board assemblies 250A (as shown, a four by four array) to which the solder layers 160 have not yet been applied.

The contact members 170 are mounted in the passages 146 of respective inner base members 140. More particularly, each contact member 170 is secured in a respective passage 146 such that its body 172 is disposed in a riser 144, its contact end 176 extends outwardly above the riser 144, and its connector feature 174 extends outwardly below the inner base member 140. The contact members 170 are thereby axially and rotationally fixed with respect to the inner base member 140. The contact members 170 can be secured in the inner base members 140 by any suitable means such as interference fit, bonding (e.g., adhesive), welding, and/or insert molding. Each inner base member 140 and the contact members 170 mounted therein form a base/contact subassembly 116.

A plurality of the base/contact subassemblies 116 are then mounted on the intermediate multi-unit PCB assembly 200A. More particularly, each base/contact subassembly 116 is mounted on a respective one of the circuit board assemblies 250A. According to some embodiments, the contact end 176 of each contact member 176 extends through the corresponding PCB substrate 151 and is exposed on the top side of said PCB substrate 151. The contact members 176 may be temporarily or permanently secured to the PCB substrate 151 by an interference fit, for example.

Thereafter, with the base subassemblies 116 mounted on the PCB assembly 200A as shown in FIG. 5, a layer of solder 260B is applied to the side 252B of the PCB assembly 200A opposite the inner base members 140 to form a soldered multi-unit PCB subassembly 200B. In this manner, a plurality of the circuit board assemblies 150 are formed, still joined along the break lines 253 and each including a respective solder layer 160. Thus, a plurality of subunits 202 each including a circuit board assembly 150 and a base/contact subassembly 116 are provided in a unitary PCB subassembly 200A. According to some embodiments, the solder layer 260B is applied to the PCB assembly 200A by wave soldering. The PCB assembly 200A may be supported by and/or conveyed through a wave soldering apparatus on a suitable fixture. According to some embodiments, the solder layers 160 mechanically and electrically couple the contact members 170 to the corresponding PCB 152 and electrical circuit 159.

The individual subunits 202 are then separated or singulated by breaking along the break lines 253. Thereafter, an outer base member 130 is mounted on each inner base member 140 to form a base assembly 115. More particularly, the inner base member 140 (with the contact members 170 and the circuit board assembly 150 mounted thereon) is installed in the opening 136 of the outer base member 130. The base members 130, 140 may be secured together as discussed above (e.g., by bonding or welding).

A cover member 120 is then mounted on each base assembly 115 and over the corresponding circuit board assembly 150 to form the photocontrol devices 100. The cover member 120 may be secured to the circuit board assembly 150 by mechanical interlock (e.g., cooperating snap fit features), bonding or any other suitable technique. According to some embodiments, the outer base member 130 is rotationally fixed with respect to the cover member 120 and the inner base member 140 so that the contact members 170 are rotationally and axially fixed with respect to the cover member 120 and the inner base member 140.

Photocontrol devices and methods for forming the same as disclosed herein can provide at least certain advantages over known devices and methods. The two-piece base assembly 115 allows a panel 200A of circuit board assemblies 150A to be wave-soldered with the contact members 170 mounted in the PCBs 152 and also pre-mounted in the inner base member 140, while nonetheless providing end products each having a base assembly 115 having a diameter that is greater than that of the corresponding PCB 152. By comparison, a one-piece base having a diameter greater than that of the PCB 152 would not allow adequate clearance between the circuit board assemblies 250A in the multi-unit PCB assembly 200A, thus preventing the use of a multi-unit wave soldering process.

According to embodiments of the present invention, the wave soldering process can be used to directly mechanically and electrically connect the contact members 170, as well as other electrical components, to the PCBs 152. In this manner, additional processes such as hand soldering, riveting or screwing to connect the contact members 170 to the PCBs 152 can be avoided.

Additionally, because the contact members 170 can be pre-press fit or pre-molded into the inner base members 140, the need for brackets, screws, rivets and associated processes for accomplishing this connection can be eliminated.

The wave soldering process is further facilitated by orienting the copper side of the circuit board assembly 150 upwardly (i.e., away from the base member 140).

Accordingly, the photocontrol devices and methods as described herein can provide improved manufacturing efficiency and cost reduction by enabling wave soldering of a unitary panel including a plurality of PCBs.

With reference to FIG. 9, a photocontrol device 300 according to further embodiments of the present invention is shown therein. The photocontrol device 300 corresponds to and may be used in the same manner as the photocontrol device 100 except as follows. In the photocontrol device 300, the outer base member 330 and the inner base member 340 include cooperating mechanical interlock (e.g., snap fit) features 337, 347 by which they are secured together to form a base assembly 315. The base members 330, 340 are also provided with annular grooves 332D and 342D within which are seated sealing O-rings 390, 392 to provide an environmental seal for the enclosure cavity 302. The photocontrol device 300 can thereby be made rainproof or rain-resistant.

While photocontrol devices have been described hereinabove with regard to use with a light fixture 20, according to some embodiments, photocontrol devices of the present invention can be used to control light fixtures of other types as well as electrically powered devices of other types (e.g., motors or switches).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A photocontrol device for controlling a powered device, the photocontrol device comprising:
    a housing assembly defining a cavity and including a base assembly, the base assembly including:
        an outer base member having a base opening; and
        an inner base member separately formed from the outer base member and mounted in the base opening, the inner base member including a contact member passage extending therethrough;
    a circuit board disposed in the cavity;
    a photosensor connected to the circuit board;
    an elongate contact member mechanically and electrically coupled to the circuit board, wherein the elongate contact member is mounted on and extends through the contact member passage of the inner base member such that a portion of the elongate contact member is fully circumferentially surrounded by the inner base member, the elongate contact member being adapted to electrically connect the photocontrol device with the powered device.

2. The photocontrol device of claim 1 wherein the inner base member is welded to the outer base member.

3. The photocontrol device of claim 1 wherein the inner base member is mechanically secured to the outer base member by interlock features.

4. The photocontrol device of claim 1 including an O-ring interposed between the inner base member and the outer base member to provide an environmental seal.

5. The photocontrol device of claim 1 wherein the housing assembly includes a cover member mounted on the outer base member and defining the cavity.

6. The photocontrol device of claim 5 wherein the cover member includes a translucent portion to expose the photosensor to ambient light.

7. The photocontrol device of claim 1 including a conductor layer on a side of the circuit board opposite the inner base member.

8. The photocontrol device of claim 7 wherein the conductor layer is a wave soldered layer.

9. The photocontrol device of claim 7 including a plurality of electronic components mounted on a side of the circuit board proximate the inner base member, wherein the electronic components have contacts that extend through the circuit board and are electrically connected by the conductor layer.

10. The photocontrol device of claim 1 wherein the powered device is a lighting device.

11. A lighting system comprising:
a lighting device including a lamp and a photocontroller connector; and
a photocontrol device operatively connected to the photocontroller connector, the photocontrol device comprising:
a housing assembly defining a cavity and including a base assembly, the base assembly including:
an outer base member having a base opening; and
an inner base member separately formed from the outer base member and mounted in the base opening, the inner base member including a contact member passage extending therethrough;
a circuit board disposed in the cavity;
a photosensor connected to the circuit board;
an elongate contact member mechanically and electrically coupled to the circuit board, wherein the elongate contact member is mounted on and extends through the contact member passage of the inner base member such that a portion of the elongate contact member is fully circumferentially surrounded by the inner base member;
wherein the elongate contact member engages the photocontroller connector to electrically connect the photocontrol device with the lighting device; and
wherein the photocontrol device is operative to control the lighting fixture responsive to light incident on the photosensor.

12. A method for manufacturing a photocontrol device for controlling a powered device, the method comprising:
mounting an elongate contact member in an inner base member such that the elongate contact member extends through a contact member passage defined in the inner base member and a portion of the elongate contact member is fully circumferentially surrounded by the inner base member, wherein the elongate contact member is adapted to electrically connect the photocontrol device with the powered device;
mounting the elongate contact member on a circuit board electrically connected to a photosensor; and
mounting the inner base member with the elongate contact member in an opening of an outer base member to form a base assembly.

13. The method of claim 12 including applying a conductor layer to the circuit board while the elongate contact member is mounted in each of the inner base member and the circuit board to electrically connect the elongate contact member to the circuit board.

14. The method of claim 13 including applying the conductor layer to a side of the circuit board opposite the inner base member while the elongate contact member is mounted in each of the inner base member and the circuit board to electrically connect the elongate contact member to the circuit board.

15. The method of claim 14 including:
mounting a plurality of electronic components on a side of the circuit board proximate the inner base member such that contacts of the electronic components extend through the circuit board; and thereafter
applying the conductor layer to the side of the circuit board opposite the inner base member while the elongate contact member is mounted in each of the inner base member and the circuit board to electrically connect the elongate contact member and the contacts to the circuit board by the conductor layer.

16. The method of claim 14 wherein applying the conductor layer to the circuit board includes wave soldering the conductor layer onto the side of the circuit board opposite the inner base member with the elongate contact member mounted in the inner base member and the circuit board to electrically connect the elongate contact member to the circuit board.

17. The method of claim 16 including:
forming a unitary circuit board assembly including a plurality of circuit boards;
providing a plurality of inner base members, a plurality of outer base members, and a plurality of elongate contact members;
mounting each of the elongate contact members in a respective one of the inner base members;
mounting each of the elongate contact members on a respective one of the circuit boards of the unitary circuit board assembly; thereafter
wave soldering an assembly conductor layer onto the unitary circuit board assembly;
separating the circuit boards from one another to form subunits each including a respective elongate contact member, a respective inner base member, a respective circuit board, and a respective conductor layer from the assembly conductor layer electrically connecting the respective elongate contact member to the respective circuit board; and
mounting each subunit in a respective outer base member such that the inner base member of the subunit is received in an opening of the respective outer base member to form a base assembly.

18. The method of claim 17 including mounting a respective cover member on each of the base assemblies.

19. The method of claim 12 including welding each inner base member to the outer base member in which it is received.

20. The method of claim 12 including mechanically securing each inner base member to the outer base member in which it is received using interlock features.

21. A method for manufacturing a photocontrol device for controlling a powered device, the method comprising:
mounting an elongate contact member in an inner base member, wherein the elongate contact member is adapted to electrically connect the photocontrol device with the powered device;
mounting the elongate contact member on a circuit board electrically connected to a photosensor; thereafter
applying a conductor layer to the circuit board while the elongate contact member is mounted in each of the inner base member and the circuit board to electrically connect the elongate contact member to the circuit board; and thereafter
mounting the inner base member with the elongate contact member in an opening of an outer base member to form a base assembly.

22. The method of claim 21 including:
mounting a plurality of electronic components on a side of the circuit board proximate the inner base member such that contacts of the electronic components extend through the circuit board; and thereafter
wave soldering the conductor layer to a side of the circuit board opposite the inner base member while the elongate contact member is mounted in each of the inner base member and the circuit board to electrically connect the elongate contact member and the contacts to the circuit board by the conductor layer.

23. The method of claim 21 including:
forming a unitary circuit board assembly including a plurality of circuit boards;
providing a plurality of inner base members, a plurality of outer base members, and a plurality of elongate contact members;
mounting each of the elongate contact members in a respective one of the inner base members;
mounting each of the elongate contact members on a respective one of the circuit boards of the unitary circuit board assembly; thereafter
wave soldering an assembly conductor layer onto the unitary circuit board assembly;
separating the circuit boards from one another to form subunits each including a respective elongate contact member, a respective inner base member, a respective circuit board, and a respective conductor layer from the assembly conductor layer electrically connecting the respective elongate contact member to the respective circuit board; and
mounting each subunit in a respective outer base member such that the inner base member of the subunit is received in an opening of the respective outer base member to form a base assembly.

24. A photocontrol device for controlling a powered device, the photocontrol device comprising:
a housing assembly defining a cavity and including a base assembly, the base assembly including:
an outer base member having a base opening; and
an inner base member separately formed from the outer base member and mounted in the base opening;
a circuit board disposed in the cavity;
a photosensor connected to the circuit board;
a conductor layer on a side of the circuit board opposite the inner base member;
a plurality of electronic components mounted on a side of the circuit board proximate the inner base member, wherein the electronic components have contacts that extend through the circuit board and are electrically connected by the conductor layer; and
an elongate contact member mechanically and electrically coupled to the circuit board, wherein the elongate contact member is mounted on and extends through the inner base member, the elongate contact member being adapted to electrically connect the photocontrol device with the powered device;
wherein the conductor layer is a wave soldered layer.

* * * * *